United States Patent Office 3,414,074
Patented Dec. 3, 1968

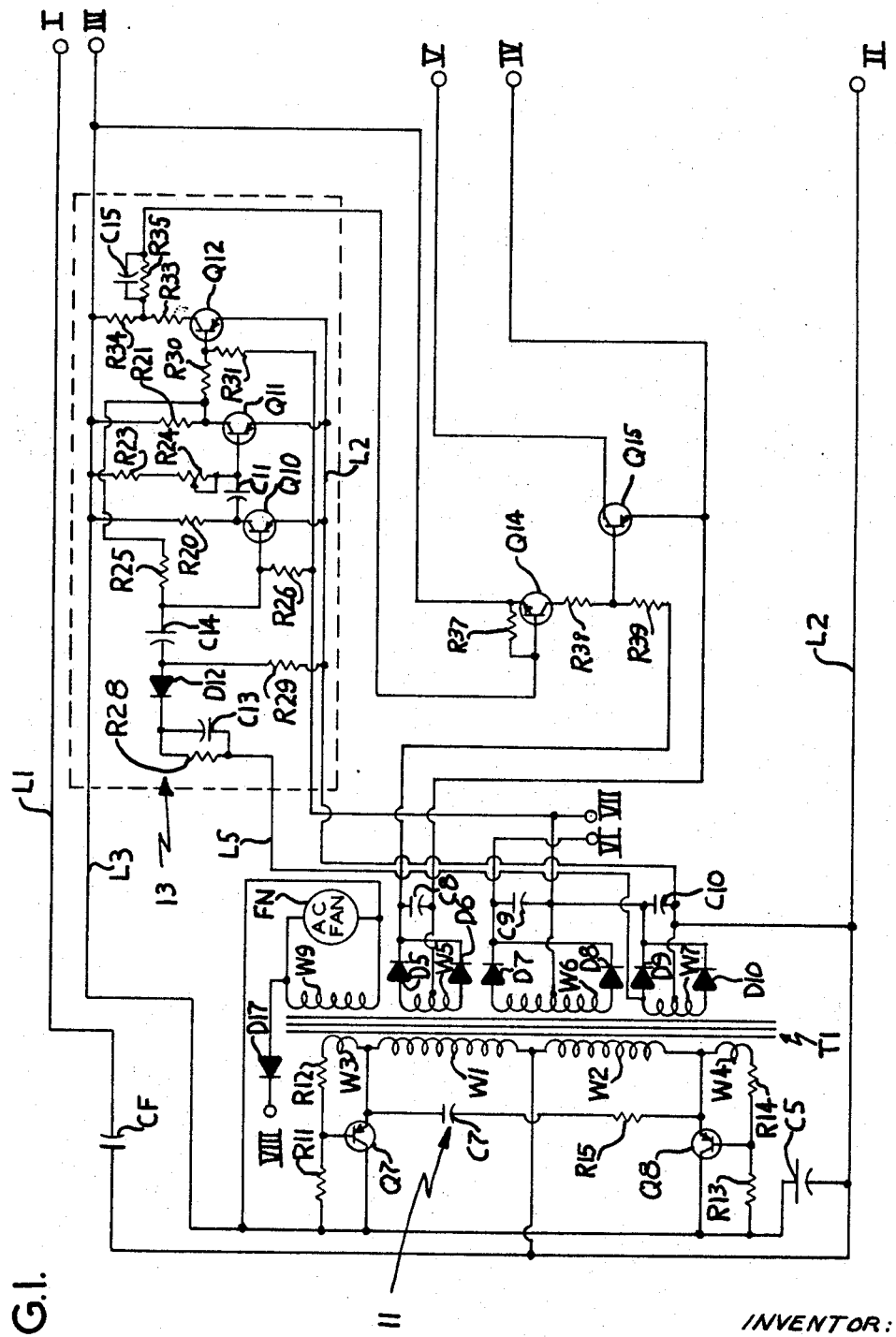

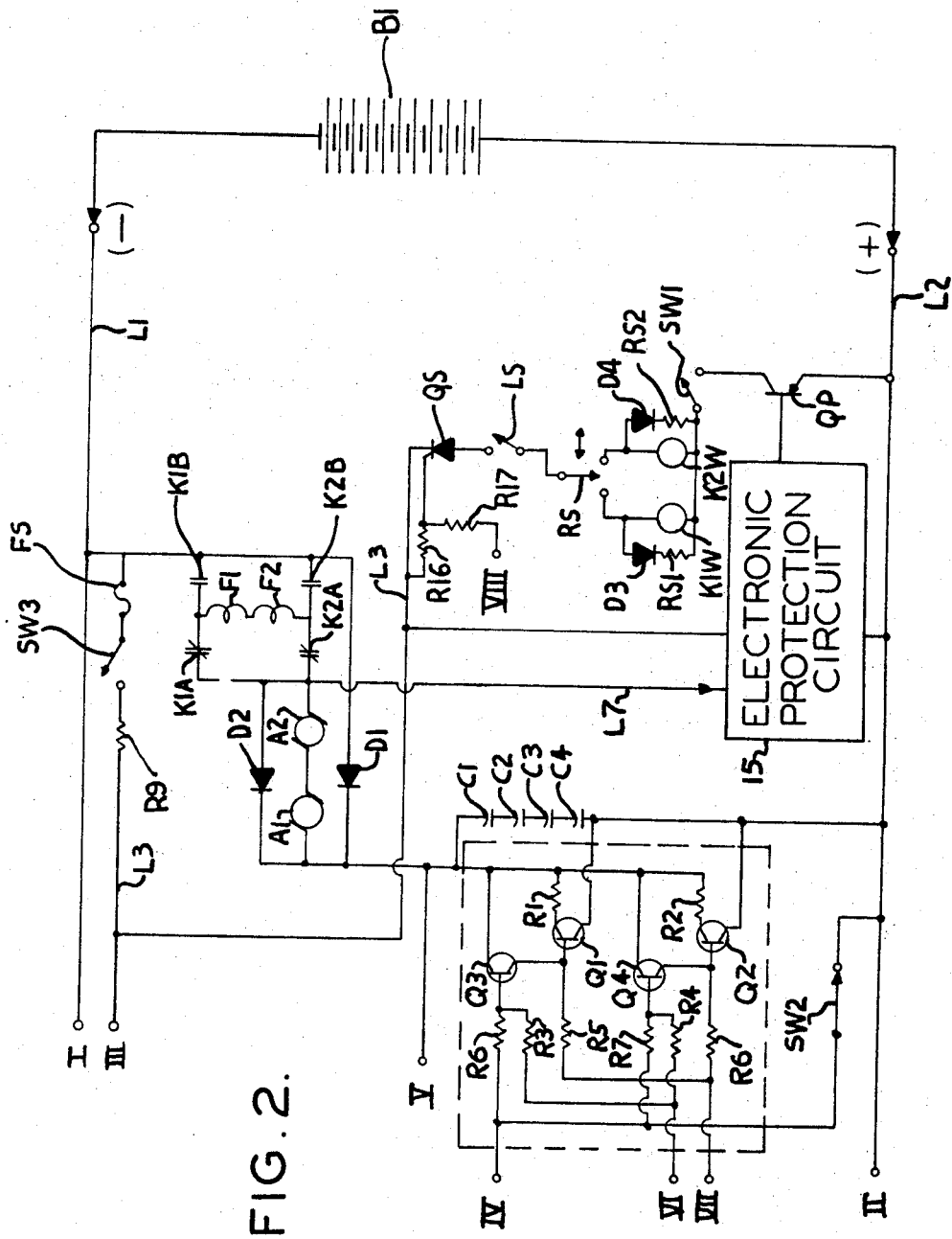

3,414,074
SAFETY CONTROL CIRCUIT FOR AN ELECTRIC TRUCK
Alan C. Dannettell, Philadelphia, Pa., assignor to Eaton Yale & Towne Inc., Cleveland, Ohio, a corporation of Ohio
Filed Jan. 23, 1967, Ser. No. 611,103
10 Claims. (Cl. 180—101)

ABSTRACT OF THE DISCLOSURE

In an electric truck, seat-operated contacts are provided for deenergizing the truck's traction motor when the operator of the truck leaves his seat and for simultaneously protecting semiconductor speed control circuitry which varies the energization of the motor. Further means are provided for preventing energization of the motor until bias voltages are provided to the semiconductor circuitry.

Background of the invention

This invention relates to a safety control circuit for an electric truck and more particularly to such a circuit for use in an electric truck having a D.C. motor and semiconductor current switching means for varying the energization of the motor.

In electric trucks such as industrial trucks it is highly desirable to provide seat-operated safety means for deenergizing the truck motor when the operator of the truck is not in his seat. However in electric trucks having D.C. motors operated on current provided by batteries and having semiconductor current switching means for applying unidirectional pulses of current to the motor, the duty cycle of the switching being adjustable for varying of the energization of the motor, it is typically undesirable or dangerous to merely cut off power to the semiconductor control circuitry by such seat-operated means since the control circuitry may be damaged or may contain energy storage means which will maintain energization of the motor for an unacceptably long period.

Summary of the invention

Among the several objects of the present invention may be noted the provision of a safety control circuit for an electric truck having a D.C. motor operated on current provided by batteries and having semiconductor current switching means for applying unidirectional pulses of current to the motor, which safety control circuit deenergizes the motor quickly when the operator of the truck leaves his seat without damaging the semiconductor control circuitry; the provision of such a control circuit which will provide rapid deenergization of the motor even though control circuitry for the semiconductor currents switching means includes means for storing energy sufficient to maintain energization of the control circuitry for an appreciable interval after the termination of current flow thereto; the provision of such a control circuit suitable for use with transistor current switching means requiring suitable bias voltages; the provision of such a safety circuit including means for preventing energization of the transistor current switching means until such bias voltages are provided; the provision of such a control circuit which is highly reliable and is relatively simple and inexpensive. Other objects and features will be in part apparent and in part pointed out hereinafter.

A safety control circuit according to this invention is useful in an electric truck having a D.C. motor operating on current provided by batteries and having semiconductor current switching means for applying unidirectional pulses of current to the motor. The truck also includes a seat for an operator. The duty cycle of the switching means is adjustable by control circuitry for varying the energization of the motor. The control circuitry includes a filter capacitor capable of storing energy sufficient to maintain energization of the control circuitry for an appreciable interval after the termination of the flow of current thereto. The safety control circuit includes at least one contactor having contacts in series with said motor and a winding which when energized closes said contacts. A seat-operated switch is provided which includes contacts for cutting off the supply of current to the control circuitry when the operator of said truck is not in his seat and includes also contacts for deenergizing the contactor winding independently of the deenergization of the control circuitry whereby when the seat switch is released the flow of power to the control circuitry is cut off and the motor is deenergized immediately even though the filter capacitor is charged.

In another aspect of this invention, the seat-operated switch includes contacts for shorting the input circuit of the semiconductor current switching means.

In still another aspect, the control circuit includes means for preventing energization of the contactor winding until a suitable bias voltage is provided to the semiconductor current switching means.

Brief description of the drawings

FIGS. 1 and 2 together are a schematic circuit diagram of a safety control circuit according to this invention, connections between the two figures being indicated by corresponding Roman numerals.

Corresponding reference characters indicate corresponding parts throughout the drawings.

Referring now to the drawings, there are indicated at F1 and F2 the field windings of a pair of D.C. traction motors. Two motors are employed to conveniently permit a differential in movement between the right-hand and left-hand wheels of the truck when turning corners, although it is to be understood that a single motor with or without multiple windings may also be used. The armatures of these motors are indicated at A1 and A2 respectively. These motors are energized from batteries indicated at B1 which provide direct current to a pair of bus bars or supply leads L1 and L2. A filter capacitor CF is connected across leads L1 and L2.

The field windings F1 ad F2 are connected in series with each other and the armatures A1 and A2 are similarly connected in series with each other. The field windings F1 and F2 may further be connected in series with the armature windings A1 and A2 in either direction or polarity by means of a pair of contactors which are connected as a reversing switch. One of the contactors includes a set of normally closed contacts K1A and a set of normally open contacts K1B. Contacts K1A and K1B are selectively operated to their respective reverse positions by the energization of a control winding K1W. The other contactor includes a set of normally closed contacts K2A and a set of normally open contacts K2B which are operated by the energization of a control winding K2W. By energizing the contact winding K1W the field windings F1 and F2 may be connected in series with the armature windings in one sense for providing rotation in a first or forward direction. Conversely, by energizing the other contactor winding K2W the field windings may be connected in the opposite polarity with respect to the armature windings thereby providing motor rotation in the opposite or reverse direction.

As is explained in greater detail hereinafter, the motors are energized by unidirectional pulses of current passed by semiconductor current switching devices. To permit the inductively stored current to flow during the intervals between the pulses, the field windings and the armatures together are shunted by a diode D1. The armatures are shunted by a diode D2 for clipping transients.

One side of each of the contactor windings K1W and K2W is connected to a supply lead L3 through a respective side of a double-pole center-off switch RS, a lock switch LS and the anode-cathode circuit of an SCR QS (silicon controlled rectifier). Lock switch LS is key operated and is employed to prevent unauthorized operation of the truck. The switch RS is manually operated and allows the operator of the truck to energize one or the other of windings K1W and K2W thereby to determine the direction of movement upon energization of the traction motors by the control circuitry.

As is explained in greater detail hereinafter, SCR QS is operated to prevent energization of the contactor windings until suitable bias voltages are available to the control circuitry.

The other end of each of the contactor windings is connected to lead L2 through a circuit which includes a set of normally open contacts SW1, which comprise a part of a seat-operated safety switch, and the collector-emitter circuit of a transistor QP. Transistor QP is operated under the control of an electronic protection circuit 15. Protection circuit 15 forms no part of the present invention and accordingly is not described in detail herein. Briefly, however, protection circuit 15 is responsive to a fault or failure in the transistor circuitry described hereinafter, as sensed through a lead L7, and is operative to cut off transistor QP upon the occurrence of such a fault. Cutting off transistor QP deenergizes the contactor windings K1W and K2W so as to remove current from the motors.

Each of the contactor windings K1W and K2W is shunted by a network for suppressing inductive surges upon deenergization of the winding. Each of the networks comprises a respective diode D3 and D4 and a respective resistor RS1 and RS2.

The armatures A1 and A2 and the field windings F1 and F2 are connected across supply leads L1 and L2 by a circuit which includes the contactor contacts described previously and the collector-emitter circuits of a series of parallel-connected PNP transistors, two of which are shown by way of example at Q1 and Q2. It is to be understood that said series of transistors will include as many paralleled transistors as may be necessary to carry the motor current. As is explained in greater detail hereinafter, transistors Q1 and Q2 function as semiconductor current switching means for applying unidirectional pulses of current to the motors. In other words, transistors Q1 and Q2 are operated either in a cutoff state or in a fully saturated state. The collector leads of the parallel-connected transistors such as Q1 and Q2 include low-value resistors, e.g., R1 and R2 repectively, which insure that the current drawn by the motors is shared substantially equally by the parallel-connected transistors. The collector emitter circuits of transistors Q1 and Q2 are shunted by commutating capacitors C1–C4 for suppressing switching transients.

Conduction in the transitsors Q1 and Q2 is controlled through respective PNP driver transistors Q3 and Q4 operated as emitter followers, the emitters of the driver transistors being connected to the base terminals of the power switching transistors Q1 and Q2. By means described in greater detail hereinafter, a suitable bias voltage is applied to the base terminals of transistors Q3 and Q4 through resistors R3 and R4 from a lead indicated at VI and, similarly, a suitable bias voltage is supplied to the base terminals of transistors Q1 and Q2 through resistors R5 and R6 from a lead as indicated at VII.

A pulse signal for controlling the periods of energization or duty cycle of the power switching transistors Q1 and Q2 is applied to the base terminals of driver transistors Q3 and Q4 through respective resistors R6 and R7 from a lead as indicated at IV. This lead is selectively connected to supply lead L2 through a set of normally closed contacts SW2. Contacts SW2 comprise a portion of the seat-operated safety switch mentioned previously and are operative to cut off transistors Q1–Q4 independently of any pulse signal applied through the lead IV by connecting the base terminals of transistors Q3 and Q4 to the emitter terminals of transistors Q1 and Q2.

Current for energizing the various control circuits which determine the periods of conduction of transistors Q1 and Q2 and the motor contactor circuit described previously is provided to a supply lead L3 from lead L1 through a fuse FS and a set of normally open contacts SW3. Contacts SW3 also form a part of the seat-operated safety switch. Current provided to lead L3 is filtered by a network which includes a series resistor R9 and a filter capacitor C5 having substantial energy storage capability (see FIG. 1).

Current taken from leads L3 and L2 is employed to energize an inverter power supply indicated generally at 11. Inverter power supply 11 is essentially conventional and comprises a transformer T1 having primary windings W1 and W2 and feedback windings W3 and W4 which are interconnected with a pair of PNP transistors Q7 and Q8 in an oscillator circuit for converting the D.C. available from leads L3 and L2 to alternating current in conventional manner. Transistors Q7 and Q8 are biased by respective networks comprising resistors R11–R14. A commutating network comprising a resistor R15 and a capacitor C7 is connected across primary windings W1 and W2.

Transformer T1 includes a plurality of center tapped secondary windings W5–W7. These secondary windings provide alternating currents which are full-wave rectified by diodes D5–D10 and filtered by capacitors C8–C10 to provide various D.C. voltages for properly biasing the transistors Q1–Q4 described hereinbefore and the various other transistor control circuits described hereinafter. As is understood by those skilled in the art, these bias voltages are necessary for the proper and safe operation of the transistor circuits and are available only after the inverter oscillations have built up to substantially full amplitude. Further, this build-up of the oscillations may take a significant period of time after power is applied to lead L3 by the closure of contacts SW3.

Transformer T1 also includes a secondary winding W9 for providing alternating current to energize an A.C. fan FN provided to cool the power transistor circuitry. A signal taken from this winding W9 is also employed to trigger the SCR QS in the contactor winding circuit described previously. One side of winding W9 is connected to lead L3 and the other side is connected to the gate terminal of SCR QS through a diode D17 and a voltage divider comprising a pair of resistors R16 and R17. The values of resistors R16 and R17 are selected so that SCR QS is triggered into conduction only when the oscillations of the inverter power supply 11 have reached substantially full amplitude. Thus SCR QS will not permit the contactor windings K1W and K2W to be energized until the proper bias voltages are applied to the transistor circuits by the inverter power supply 11.

One side of secondary winding W7 is connected to a lead L5 for providing A.C. triggering signals of substantially constant frequency to a multivibrator circuit indicated generally at 13. Multivibrator circuit 13 includes a pair of PNP transistors Q10 and Q11 interconnected in an essentially conventional monostable or one-shot multivibrator circuit. The emitters of transistor Q10 and Q11 are connected to lead L2 and their collectors are connected to lead L3 through respective load resistors R20 and R21. The output signal from the collector transistor Q10 is coupled to the base of transistor Q11 through a timing capacitor C11 and the base of this transistor is normally forward biased by current taken from lead L3 through a fixed resistor R23 and a rheostat R24. The output signal from the collector of transistor Q11 is applied to the base of transistor Q10 through a network comprising resistors R25 and R26 to provide the regenerative switching mode of operation characteristic of the monostable multivibrator circuit. As is understood by those skilled in the art, the circuit comprising transistors Q10 and Q11 normally remains in a stable state in which transistor Q11 conducts and transistor Q10 is cut off but that the circuit may be triggered, by signals applied to the base of transistor Q10, to a second state in which transistor Q10 conducts and transistor Q11 is cut off. This second state persists for a period of time determined by the relative values of capacitor C11 and of rheostat R24 and resistor R23.

The signals provided by winding W7 through lead L5 are coupled to the base of transistor Q10 through a shaping network comprising a pair of resistors R28 and R29, a pair of capacitors C13 and C14 and a diode D12. The signals coupled through this network cause the monostable multivibrator circuit including transistors Q10 and Q11 to be triggered at a substantially constant rate determined by the operating frequency of inverter 11.

An output signal taken from the collector of transistor Q11 is applied through a resistor R30 to the base of a PNP transistor Q12 which is operated as a common emitter amplifier. D.C. bias is also applied to the base of transistor Q10 from the inverter power supply through resistor R31. The emitter of transistor Q12 is connected to lead L2 and its collector is connected to lead L3 through a pair of load resistors R33 and R34.

A pulse signal taken from between resistors R33 and R34 through a network comprising a resistor R35 and a capacitor C15 is further amplified by an NPN transistor Q14 and a PNP transistor Q15, appropriate biasing and signal coupling being provided through resistors R37–R39.

The amplified pulse signals provided at the emitter of transistor Q15 are applied, through the lead indicated at IV, to the base terminals of the driver transistors Q3 and Q4 as described previously. The power amplifier stages comprising transistors Q1–Q4, when driven by this pulse signal, apply unidirectional pulses of current to the traction motors. The frequency at which the pulses are applied to the motor is determined by the frequency of operation of the inverter power supply 11 while the duration of each pulse or duty cycle of the power transistors Q1 and Q2 is determined by the period of operation of the monostable multivibrator circuit 13.

As is explained in greater detail in my copending application Ser. No. 415,974, now Patent No. 3,349,309 and in my earlier issued Patent 3,243,681, the energization of the traction motors can thus be selectively varied by adjusting the setting of rheostat 24 thereby to control the speed of the truck.

The operation of the safety control circuit is substantially as follows. When the operator is not in his seat and contacts SW1, SW2 and SW3 are all in the positions illustrated, the truck cannot be operated since the contactor windings K1W and K2W cannot be energized through open contacts SW1, the power and driver transistors Q1–Q4 are cut off by the closure of contacts SW2, and there is no power being provided to the control circuitry through the open contacts SW3.

When the operator occupies his seat so that the position of each of the contacts SW1–SW3 is reversed from the condition illustrated, power is applied to the control circuitry through lead L3 by the closure of SW3. Although power is available to the control circuitry, the contacts K1W and K2W cannot be energized until the oscillations of the inverter power supply come up to full amplitude thereby triggering the SCR QS through winding W9. Once SCR QS is triggered into conduction, operation of the switch RS can then cause one or the other of the contactor windings K1W and K2W to be energized so that the motor-power transistor circuit is completed between leads L1 and L2. By the time this can happen the inverter power supply is providing appropriate bias voltage to each of the transistor stages so that they operate in their intended mode. As is understood by those skilled in the art, if the power transistors Q1 and Q2 were operated to carry the motor currents without suitable biasing, they would be rapidly burned out. The operation of the seat switch also opens contacts SW2 allowing the control pulse signals to be applied to the driver and output transistors and thus, in this condition the traction motors may be operated normally under the control of the transistor circuitry.

If the operator leaves his seat, the control circuitry and the motor are immediately deenergized by the operation of the seat switch contacts independently of the other controls. The closing of the contacts SW2 cuts off the transistors Q1–Q4 by shorting the input circuits thereby preventing burning out of these transistors or energization of the traction motors in normal fashion. However, as it is possible for the power transistor Q1 or Q2 to fail during operation by shorting, it is also highly desirable that the deenergization of the traction motors be further assured by deenergizing the contactors. The opening of seat switch contacts SW3 cuts off all flow of power into the control circuitry from the battery B1 but this, of itself, is not sufficient to insure that the contactor windings K1W and K2W will be immediately deenergized because of the appreciable energy stored in the control circuit filter capacitor C5. The opening of the seat switch contact SW1, however, immediately deenergizes the contactors since these contacts are interposed between the contactor windings and the filter capacitor. Thus the complete and immediate deenergization of the traction motors is ensured.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In an electric truck having a D.C. motor operating on current provided by batteries and having semiconductor current switching means for applying unidirectional pulses of current to said motor, the duty cycle of said switching means being adjustable for varying the energization of the motor, said truck also including a seat for an operator; a safety control circuit comprising:

at least one contactor having contacts in series with said motor and a winding which when energized closes said contacts;

control circuitry for varying the duty cycle of said semiconductor current switching means, said control circuitry including filter capacitor means capable of storing energy sufficient to maintain energization of said control circuitry for an appreciable interval after the termination of the flow of current thereto; and a seat-operated switch including contacts for cutting off the supply of current to said control circuitry when the operator of said truck is not in his seat and including also contacts for deenergizing said contactor winding independently of the deenergization of said control circuitry whereby when said seat switch is released the flow of power to said control circuitry is cut off and said motor is deenergized immediately even though said filter capacitor means are charged.

2. A safety control circuit as set forth in claim 1 in which said semiconductor current switching means includes an output circuit in series with said motor and an input circuit for controlling conduction in said output circuit and wherein said seat-operated switch further includes contacts for shorting said input circuit when the operator of said truck leaves said seat.

3. In an electric truck having a D.C. motor operating on current provided by batteries and having transistor current switching means for applying unidirectional pulses of current to said motor, said transistor current switching means including an output circuit connected in series with said motor and an input circuit for controlling conduction in said output circuit, the duty cycle of said switching means being adjustable for varying the energization of the motor, said truck also including a seat for an operator; a safety control circuit comprising:

control circuitry for varying the duty cycle of said transistor current switching means, said control circuitry including means for normally biasing said transistor current switching means to cutoff and including also filter capacitor means capable of storing energy sufficient to maintain energization of said control circuitry for an appreciable interval after the termination of the flow of current thereto; and a seat-operated switch including contacts for cutting off the supply of current to said control circuitry and for shorting the input circuit of said transistor current switching means when the operator of said truck is not in his seat whereby when said seat switch is released the flow of power to said control circuitry is cut off and conduction in said transistor switching means is cut off immediately and before discharging of said filter capacitor means causes said biasing means to become inoperative.

4. A safety control circuit as set forth in claim 3 wherein said transistor current switching means includes an output transistor and a driver transistor, the emitter of said driver transistor being connected to the base of said output transistor and wherein said contacts for shorting the input circuit of said transistor current switching means connect the base of said driver transistor to the emitter of said output transistor.

5. A safety control circuit as set forth in claim 3 wherein said control circuitry includes at least one contactor having contacts in series with said motor and said output circuit and a winding which when energized closes said contacts and wherein said seat-operated switch means includes contacts for deenergizing said contactor winding independently of the deenergization of said control circuitry.

6. In an electric truck having a D.C. motor operating on current provided by batteries and having transistor current switching means for applying unidirectional pulses of current to said motor, said transistor current switching means including an output circuit connected in series with said motor and an input circuit for controlling conduction in said output circuit, the duty cycle of said switching means being adjustable for varying the energization of the motor, a safety control circuit comprising:

at least one contactor having contacts in series with said motor and said output circuit and having also a winding which when energized closes said contacts;

control circuitry for varying the duty cycle of said transistor current switching means, said control circuitry including means for providing a bias voltage to said transistor current switching means, said bias voltage being provided only after a predetermined delay following energization of said control circuitry;

switch means including contacts for energizing said control circuitry; and means interconnected with said control circuitry for providing power to said contactor winding only after said bias voltage is provided whereby when said switch means is operated to energize said control circuitry the output circuit of said transistor current switching means remains open until said bias voltage is provided.

7. A safety control circuit as set forth in claim 6 wherein said means for providing power to said contactor winding includes an SCR in series with said winding and means for triggering said SCR when said bias voltage is provided.

8. A safety control circuit as set forth in claim 7 wherein said means for providing said bias voltage includes an oscillatory inverter and wherein said SCR is triggered when the oscillations of said inverted reach substantially full amplitude.

9. A safety control circuit as set forth in claim 6 wherein said control circuitry includes filter capacitor means capable of storing energy sufficient to maintain energization of said control circuitry for an appreciable interval after the termination of the flow of current thereto and wherein said safety control circuit further comprises switch means for deenergizing said contactor winding independently of the deenergization of said control circuitry.

10. A safety control circuit as set forth in claim 9 wherein said switch means includes contacts for shorting the input circuit of said transistor current switching means simultaneously with the deenergization of said contactor winding.

References Cited
UNITED STATES PATENTS

| | | | |
|---|---|---|---|
| 2,585,573 | 2/1952 | Moore | 318—341 X |
| 2,911,053 | 11/1959 | Ayers et al. | 180—101 |
| 3,188,545 | 6/1965 | Sheheen | 318—348 X |
| 3,214,666 | 10/1965 | Clerc | 318—341 |
| 3,223,909 | 12/1965 | Sensing et al. | 318—341 X |
| 3,239,742 | 3/1966 | Mierendorf et al. | 318—341 X |
| 3,289,062 | 11/1966 | Dannettell | 318—345 X |
| 3,337,786 | 8/1967 | Heyman et al. | 318—345 X |
| 3,349,309 | 10/1967 | Dannettell | 318—332 X |

KENNETH H. BETTS, *Primary Examiner.*